(12) United States Patent
Takagaki et al.

(10) Patent No.: US 12,145,749 B2
(45) Date of Patent: Nov. 19, 2024

(54) PIPE STRUCTURE, TRUSS STRUCTURE, AND ARTIFICIAL SATELLITE USING THE SAME

(71) Applicant: Mitsubishi Electric Corporation, Tokyo (JP)

(72) Inventors: Kazunori Takagaki, Tokyo (JP); Kazushi Sekine, Tokyo (JP); Masami Kume, Tokyo (JP); Sohei Samejima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1064 days.

(21) Appl. No.: 17/049,577

(22) PCT Filed: Apr. 26, 2019

(86) PCT No.: PCT/JP2019/017890
§ 371 (c)(1),
(2) Date: Oct. 22, 2020

(87) PCT Pub. No.: WO2019/225294
PCT Pub. Date: Nov. 28, 2019

(65) Prior Publication Data
US 2021/0047057 A1    Feb. 18, 2021

(30) Foreign Application Priority Data

May 23, 2018    (JP) ................................. 2018-099011

(51) Int. Cl.
*B64G 1/10*    (2006.01)
*B29C 70/22*    (2006.01)
(Continued)

(52) U.S. Cl.
CPC .............. *B64G 1/10* (2013.01); *B29C 70/228* (2013.01); *B29C 70/34* (2013.01); *B29C 70/44* (2013.01);
(Continued)

(58) Field of Classification Search
CPC ........ G64G 1/10; B29C 70/228; B29C 70/34; B29C 70/44; B29C 70/08; B29C 70/88;
(Continued)

(56) References Cited

U.S. PATENT DOCUMENTS 5,143,407 A * 9/1992 Cokeh ............... B29C 66/52296
285/55
6,199,595 B1 * 3/2001 Baker ................... F16L 59/024
285/47

(Continued)

FOREIGN PATENT DOCUMENTS

JP    S51-140817 U    11/1976
JP    58-71119 A    4/1983
(Continued)

OTHER PUBLICATIONS

International Search Report and Written Opinion mailed on Jul. 30, 2019 for PCT/JP2019/017890 filed on Apr. 26, 2019, 7 pages including English Translation of the International Search Report.
(Continued)

*Primary Examiner* — Benjamin P Lee
(74) *Attorney, Agent, or Firm* — XSENSUS LLP

(57) ABSTRACT

The pipe structure according to the present invention includes: a fiber-reinforced plastic pipe 5; moisture-proof foils 11, 12 which individually cover an outer circumferential surface of the pipe 5 and an inner circumferential surface thereof; and an intermediate part 4 which is made of metal and fitted to an end of the pipe 5, wherein end portions of the moisture-proof foils 11, 12 are tightly sandwiched between
(Continued)

the pipe 5 and the intermediate part 4. This configuration reliably prevents an FRP pipe from absorbing moisture, and thus, prevents the FRP pipe from shrinking due to moisture exhaustion in outer space, whereby it is possible to obtain the pipe structure having excellent dimensional stability.

14 Claims, 11 Drawing Sheets

(51) Int. Cl.
 B29C 70/34 (2006.01)
 B29C 70/44 (2006.01)
 B29C 70/78 (2006.01)
 B29C 70/88 (2006.01)
 B32B 1/08 (2006.01)
 B32B 5/12 (2006.01)
 B32B 15/04 (2006.01)
 B32B 15/14 (2006.01)
 B32B 15/20 (2006.01)
 B29K 96/00 (2006.01)
 B29K 307/04 (2006.01)
 B29K 705/02 (2006.01)
 B29L 31/00 (2006.01)

(52) U.S. Cl.
 CPC .............. *B29C 70/78* (2013.01); *B29C 70/88* (2013.01); *B32B 1/08* (2013.01); *B32B 5/12* (2013.01); *B32B 15/04* (2013.01); *B32B 15/14* (2013.01); *B32B 15/20* (2013.01); *B29K 2096/00* (2013.01); *B29K 2307/04* (2013.01); *B29K 2705/02* (2013.01); *B29K 2995/0069* (2013.01); *B29L 2031/7502* (2013.01); *B32B 2260/023* (2013.01); *B32B 2260/046* (2013.01); *B32B 2262/106* (2013.01); *B32B 2307/7265* (2013.01); *B32B 2597/00* (2013.01)

(58) Field of Classification Search
 CPC .. B32B 1/08; B32B 5/12; B32B 15/12; B32B 15/04; B32B 15/14; B32B 15/20; B32B 2260/023; B32B 2260/046; B32B 2262/106; B32B 2307/7265; B32B 2597/00; B29K 2096/00; B29K 2307/04; B29K 2995/0062; B29K 2705/02; B29K 2995/0069
 See application file for complete search history.

(56) References Cited

U.S. PATENT DOCUMENTS

| 6,293,311 | B1* | 9/2001 | Bushi | B29C 48/21 |
| --- | --- | --- | --- | --- |
| | | | | 138/143 |
| 6,923,477 | B2* | 8/2005 | Buon | F16L 11/083 |
| | | | | 138/109 |
| 8,302,633 | B2* | 11/2012 | Saltel | F16L 11/081 |
| | | | | 285/368 |
| 8,327,900 | B2* | 12/2012 | Stauffer | B29C 66/5221 |
| | | | | 156/379.8 |
| 8,950,787 | B2* | 2/2015 | Chabas | F16L 9/02 |
| | | | | 340/854.7 |
| 9,217,526 | B2* | 12/2015 | Eccleston | G01M 3/283 |
| 9,285,063 | B2* | 3/2016 | Jones | F16L 47/02 |
| 9,574,690 | B2* | 2/2017 | Clevelario | G01M 3/2853 |
| 9,631,758 | B2* | 4/2017 | Van Der Donk | F16L 47/02 |
| 9,921,127 | B2* | 3/2018 | Clevelario | G01M 3/2807 |
| 10,710,312 | B2* | 7/2020 | Peleg | B29C 66/7392 |
| 10,890,506 | B2* | 1/2021 | Nicolas | G01M 5/0033 |
| 11,204,114 | B2* | 12/2021 | Leger | F16L 21/08 |
| 11,402,038 | B2* | 8/2022 | Charlesworth | E21B 17/04 |
| 11,402,050 | B1* | 8/2022 | Francis | F16L 58/187 |
| 2003/0001307 | A1* | 1/2003 | Miller | B29D 23/001 |
| | | | | 264/171.27 |
| 2004/0066035 | A1* | 4/2004 | Buon | F16L 11/083 |
| | | | | 138/135 |
| 2004/0245774 | A1* | 12/2004 | Eccleston | F16L 33/213 |
| | | | | 285/222.1 |
| 2009/0223586 | A1* | 9/2009 | Vo | F16L 11/08 |
| | | | | 138/155 |
| 2010/0011556 | A1* | 1/2010 | Eccleston | F16L 33/01 |
| | | | | 29/428 |
| 2010/0084097 | A1* | 4/2010 | Stauffer | B29C 66/52291 |
| | | | | 156/379.8 |
| 2012/0222770 | A1* | 9/2012 | Kristiansen | G01K 11/3206 |
| | | | | 138/137 |
| 2013/0075529 | A1* | 3/2013 | Marcoe | B32B 1/08 |
| | | | | 87/9 |
| 2013/0319568 | A1* | 12/2013 | Daugherty | B32B 1/08 |
| | | | | 285/332 |
| 2014/0144538 | A1* | 5/2014 | Sillasen | B32B 15/20 |
| | | | | 138/109 |
| 2014/0312612 | A1* | 10/2014 | Dhagat | B23P 19/00 |
| | | | | 29/515 |
| 2015/0292663 | A1 | 10/2015 | Glejbol et al. | |
| 2015/0330890 | A1* | 11/2015 | Clevelario | F16L 33/16 |
| | | | | 285/96 |
| 2016/0123505 | A1* | 5/2016 | Damiens | F16L 11/12 |
| | | | | 138/133 |
| 2016/0251093 | A1 | 9/2016 | Hijmans et al. | |
| 2016/0375465 | A1* | 12/2016 | Dudat | B29C 48/09 |
| | | | | 427/230 |
| 2017/0015050 | A1* | 1/2017 | Hooberman | B29C 66/8221 |
| 2019/0003921 | A1* | 1/2019 | Nicolas | G01M 5/0025 |
| 2021/0156499 | A1* | 5/2021 | Leger | F16L 33/01 |
| 2022/0260194 | A1* | 8/2022 | Francis | F16L 33/22 |

FOREIGN PATENT DOCUMENTS

| JP | 4-107309 A | 4/1992 |
| --- | --- | --- |
| JP | 2017-219811 A | 12/2017 |

OTHER PUBLICATIONS

European Office Action issued Oct. 13, 2023 in corresponding European Patent Application No. 19807035.1, 7 pages.
Extended European search report issued on Jun. 17, 2021, in corresponding European patent Application No. 19807035.1, 9 pages.
Office Action issued on Aug. 4, 2022, in corresponding European patent Application No. 19807035.1, 5 pages.

\* cited by examiner

PIPE STRUCTURE, TRUSS STRUCTURE, AND ARTIFICIAL SATELLITE USING THE SAME

CROSS-REFERENCE TO RELATED APPLICATIONS

The present application is based on PCT filing PCT/JP2019/017890, filed Apr. 26, 2019, which claims priority to JP 2018-099011, filed May 23, 2018, the entire contents of each are incorporated herein by reference.

TECHNICAL FIELD

The present disclosure relates to truss structures used for optical observation satellites or the like, and to pipe structures being the components of the truss structures.

BACKGROUND ART

It is desired that optical observation satellites are able to take high-resolution images with high legibility and stable image quality.

In order to satisfy the desire, it is necessary for the satellites to be able to maintain stable optical observation performance in orbit for a long time.

To realize such an optical observation satellite, a large mirror and a structure to support it with its high rigidity and high dimensional stability are required.

One example of the support structures with high rigidity and dimensional stability is known as a truss structure (for example, Patent Literature 1) composed of a plurality of fiber-reinforced plastic (FRP) pipes joined by metal joints.

Such a truss structure has high rigidity, but it has a problem in dimensional stability because an FRP pipe, which once swells by absorbing moisture on the ground, shrinks in outer space due to moisture exhaustion.

On the other hand, it is known that the surface of an FRP mirror structure used in artificial satellites is covered with a moisture-proof layer, such as a metal foil layer or a plated layer, in order to avoid bad effects due to moisture absorption and moisture exhaustion of FRP (for example, Patent Document 2).

PRIOR ART DOCUMENTS

Patent Documents

Patent Document 1: Unexamined Patent Application Publication JP. 1983-71119 (Page 2-3,FIG. 3)
Patent Document 2: Unexamined Patent Application Publication JP. 2017-219811 (Page 9,FIG. 5)

SUMMARY OF THE INVENTION

Problems to be Solved by the Invention

However, when the surface of an FRP pipe is covered with a moisture-proof layer, the thermal expansion coefficients of the pipe and the moisture-proof layer are different, so that the moisture-proof foil peels off from the pipe, failing to maintain the moisture-proof effect.

The present disclosure is made to solve the above-mentioned problem, and it reliably prevents the FRP pipe from absorbing moisture to thereby prevent pipe shrinkage due to moisture exhaustion in outer space, whereby a pipe and a truss structures with high dimensional stability can be obtained.

Means for Solving the Problems

The pipe structure according to the present disclosure includes: a pipe which is made of fiber-reinforced plastic; moisture-proof foils which individually cover an outer circumferential surface of the pipe and an inner circumferential surface thereof; and an intermediate part which is made of metal and fitted to an end of the pipe, wherein end portions of the moisture-proof foils are tightly sandwiched between the pipe and the intermediate part.

The truss structure according to the present disclosure includes a plurality of the above-mentioned pipe structures and a plurality of metal joints which is jointed to the intermediate parts of the pipe structures.

Advantages of the Invention

According to the present disclosure, the end portions of moisture-proof foils which individually cover outer and inner circumferential surfaces of the pipe are tightly sandwiched between the pipe and intermediate parts. This structure reliably prevents moisture absorption, so that the shrinkage due to moisture exhaustion in outer space can be prevented. As a result, the pipe structure and the truss structure can have a high dimensional stability.

EMBODIMENTS

Hereinafter, pipe structures and truss structures for carrying out the present disclosure and the method of manufacturing the pipe structures will be described with reference to drawings.

In the description of the drawings, the same symbols are used for the same parts or equivalent parts, and duplicate descriptions will be omitted.

Embodiment 1

Figure 1:
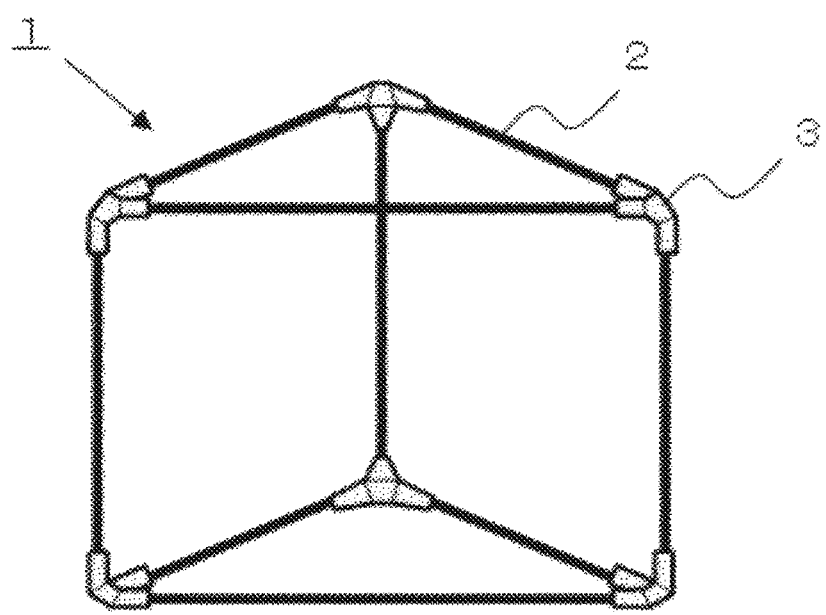
FIG. 1 is a schematic view of a truss structure of Embodiment 1 of the present disclosure.
Figure 2:
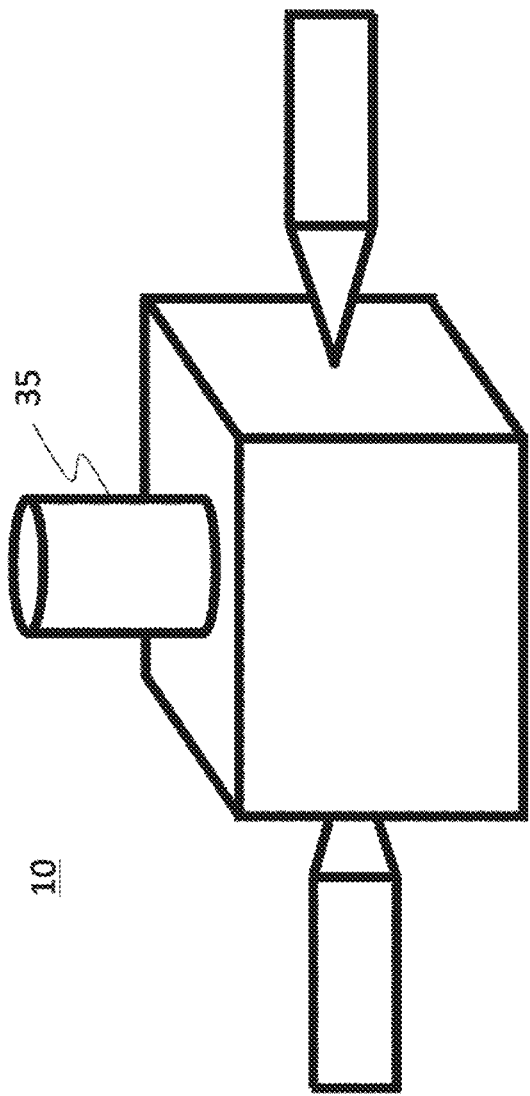
FIG. 2 is a schematic view of an artificial satellite of Embodiment 1 of the present disclosure.

FIG. 1 is a schematic view of a truss structure of Embodiment 1 for carrying out the present disclosure. As shown in FIG. 1, a truss structure 1 of the present embodiment is composed of pipe structures 2 and joints 3. FIG. 2 is a schematic view of an artificial satellite 10 using the truss structure 1 of the present embodiment. As shown in FIG. 2, the truss structure 1 of the present embodiment is a support structure which is three-dimensionally structured to support a reflector 35 and the like mounted on an artificial satellite.

Figure 3:
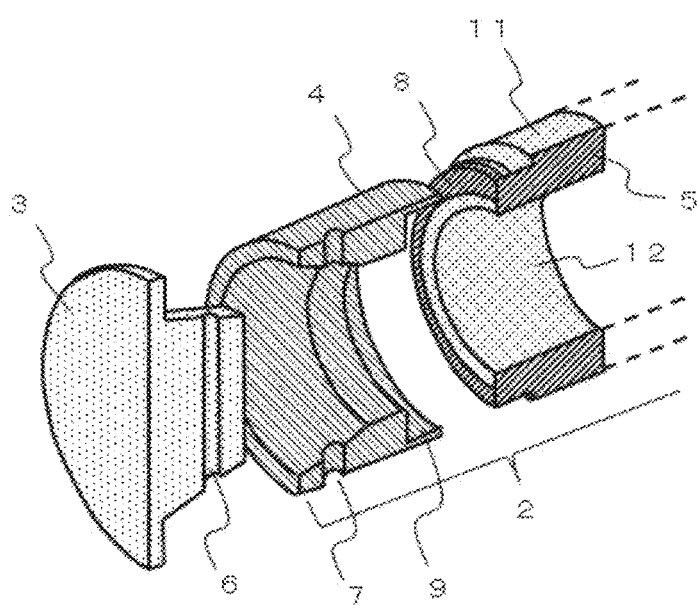
FIG. 3 is a perspective view of a joint portion of the truss structure of Embodiment 1 of the present disclosure.

FIG. 3 is a perspective view of the cross-section of the joint portion between the pipe structure 2 and the joint 3 of the present embodiment. In FIG. 3, each of its parts is shown disassembled for easy understanding, but in reality, all parts are fastened together.

As shown in FIG. 3, the pipe structure 2 includes an intermediate part 4 for being fastened to the joint 3, the pipe 5, and moisture-proof foils 11 and 12. The intermediate parts 4 are connected to both ends of the pipe 5. The intermediate parts 4 and the pipe 5 are cylindrical in shape. Each intermediate part 4 has a shape so that the joint 3 can be fitted to the pipe 5. In FIG. 3, the side opposite to a side where the joint 3 is in contact with the intermediate part 4 has a structure for the joint 3 so as to be integrated with other joints in order to form a truss structure. However, the structure of the opposite side is omitted in the figure.

The joint 3 and the intermediate part 4 are made of metal, and the pipe 5 is made of fiber-reinforced plastic. For example, a super-invar alloy made of iron, nickel, and cobalt can be used as the metal for the joint 3 and the intermediate part 4. As for the fiber-reinforced plastic that constitutes the pipe 5, for example, a carbon-fiber-reinforced plastic can be used that is made, for example, by impregnating a high-elasticity carbon fiber of K13C (made by Mitsubishi Chemical Corporation) or T800S (made by Toray Industries, Inc.) with a cyanate resin.

By, for example, using a bolt and a nut, the pipe structure 2 is fastened and fixed to the joint 3 using a penetration hole 6 formed in the joint 3 and a penetration hole 7 which is formed in the intermediate part 4 at a position corresponding to that of the penetration hole 6.

In the pipe 5, a protrusion 8 is formed at each end of the pipe so as to project toward the intermediate part 4. In the intermediate part 4, a recessed portion 9 is formed at the position where the intermediate part 4 is fitted with the protrusion 8 of the pipe 5.

The moisture-proof foils 11 and 12 for covering the surfaces of the pipe 5 are provided on the outer and inner circumferential surfaces of the pipe 5, respectively. The end portions of these moisture-proof foils 11 and 12 are tightly sandwiched between the pipe 5 and the intermediate part 4. For the moisture-proof foils 11 and 12, aluminum foils can be used, for example. The intermediate parts 4, the pipe 5, and the moisture-proof foils 11 and 12 are integrated in a pipe-structure manufacturing process described later.

Figure 4:
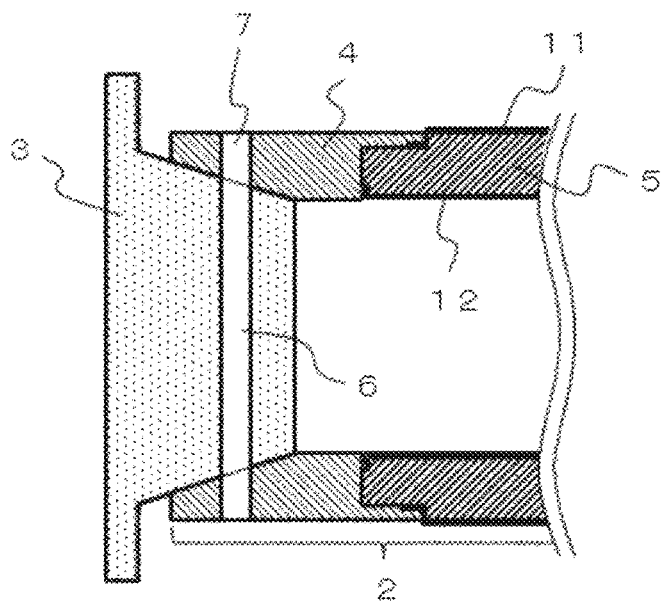
FIG. 4 is a cross-sectional schematic view of a joint portion of the truss structure of Embodiment 1 of the present disclosure.

FIG. 4 is a cross-sectional schematic view of a joint portion of the truss structure 1, at which the joint 3, the intermediate part 4, the pipe 5, and the moisture-proof foils 11 and 12 are integrated. As shown in FIG. 4, the position of the penetration hole 6 formed in the joint 3 coincides with the position of the penetration hole 7 in the intermediate part 4, to fasten the joint 3 to the intermediate part 4. Further, the intermediate part 4 and the pipe 5 are fastened with the end portions of the moisture-proof foils 11 and 12 sandwiched therebetween. The truss structure 1 shown in FIG. 1 is assembled by fastening the pipe structures 2 to the joints 3 in this manner.

Figure 5:
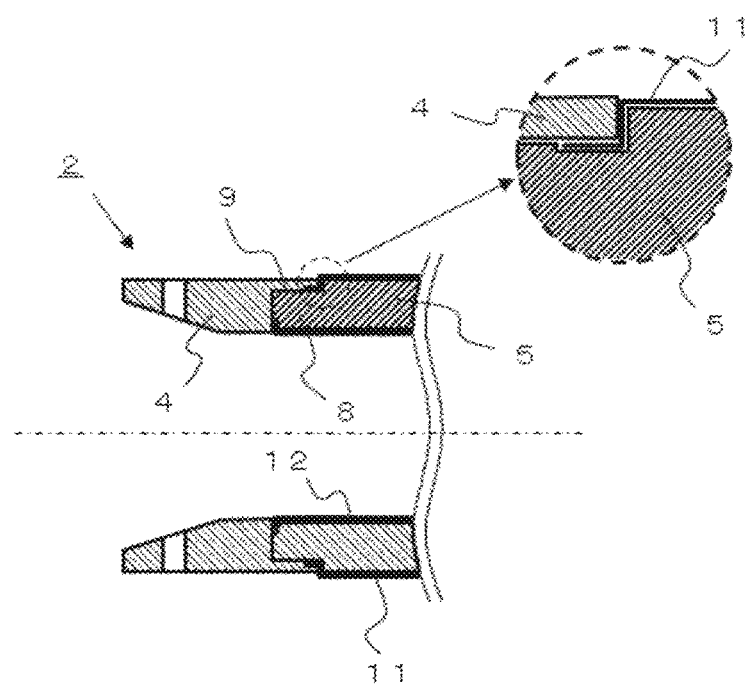
FIG. 5 is a cross-sectional schematic view of an end of a pipe structure of Embodiment 1 of the present disclosure.

FIG. 5 is a cross-sectional schematic view of an end of the pipe structure 2 of the present embodiment. The pipe 5 has a cylindrical shape and has protrusions 8 which are formed at both ends of the pipe so as to each project in the axial direction toward the intermediate part 4. In the intermediate part 4, the recessed portion 9 is formed at the position where it is fitted with the protrusion 8 of the pipe 5. The outer circumferential surface of the pipe 5 is covered with a moisture-proof foil 11, and the end portion of the moisture-proof foil 11 extends to the outer circumferential surface of the protrusion 8, so that the end portion is sandwiched between the outer circumferential surface of the protrusion 8 and the inner circumferential surface of the recessed portion 9 of the intermediate part. The inner circumferential surface of the pipe 5 is also covered with the moisture-proof foil 12, and the end portion of the moisture-proof foil 12 extends to the edge face of the tip portion of the pipe 5, so that the moisture-proof foil 12 is sandwiched between the edge face of the tip portion of the pipe 5 and the end face of the recessed portion 9 of the intermediate part.

Next, the method for manufacturing the pipe structure 2 of the present embodiment will be described. FIGS. 6 and 7 are illustrative views each showing the manufacturing process of the pipe structure 2 of the present embodiment.

Figure 6A:
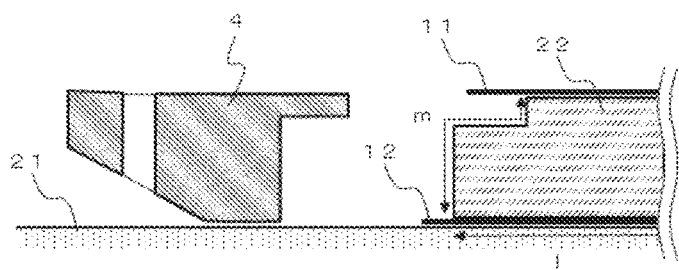
FIGS. 6A and 6B are illustrative views of a manufacturing process of the pipe structure of Embodiment 1 of the present disclosure.
Figure 7:
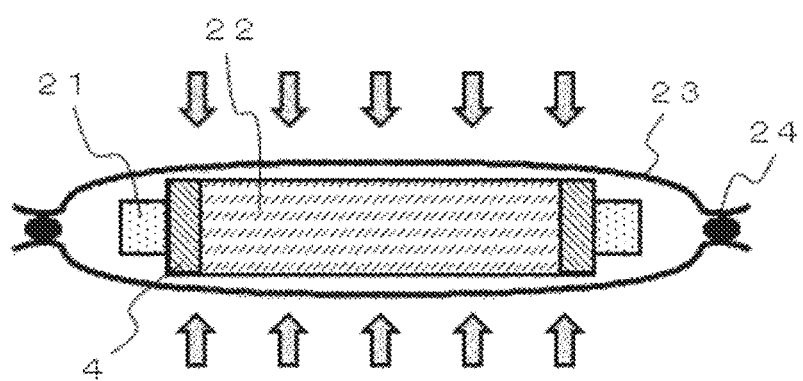
FIG. 7 is an illustrative view of a manufacturing process of the pipe structure of Embodiment 1 of the present disclosure.

First, the moisture-proof foil 12 is placed on the outer circumferential surface of a round-column shaped mandrel 21, as shown in FIG. 6(a). A plurality of prepregs is stacked on the outer surface of the moisture-proof foil 12 to form a cylindrical shape. Each prepreg is a semi-hardened sheet made by impregnating carbon fibers with resin.

At this time, in order to form a protrusion 8 projecting in the axial direction, the axial-direction length of prepregs stacked on an outer periphery side is shortened. A stack made by stacking the plurality of prepregs in a cylindrical shape is called a prepreg laminate 22.

The moisture-proof foil 11 is placed on the outer circumferential surface of the outermost prepreg. As shown in FIG. 6 (a), when the axial-direction (longitudinal) length of the prepreg laminate 22 is l and an exposed-surface length of the end portion of the prepreg laminate 22 is m, the axial-direction length of the moisture-proof foils 11 and 12 is longer than l and shorter than l+m/2. The end portions of the moisture-proof foils 11 and 12 are bent along the end portion of the prepreg laminate 22.

Figure 6B:
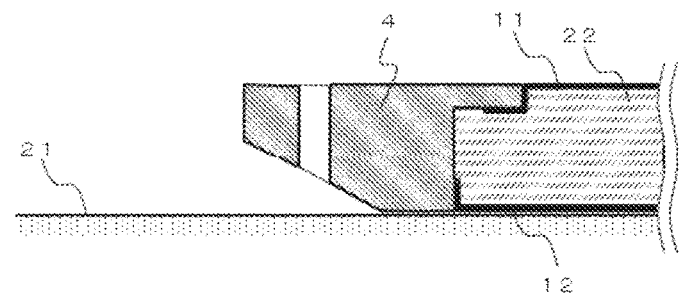

Next, as shown in FIG. 6(b), the intermediate part 4 is placed so as to be attached to the end portion of the prepreg laminate 22. At this moment, the end portions of the moisture-proof foils 11 and 12 are sandwiched between the prepreg laminate 22 and the intermediate part 4.

Next, as shown in FIG. 7, the mandrel 21, the prepreg laminate 22, and the intermediate parts 4 are covered with a bagging film 23 and are sealed with the bagging film 23 and sealing material 24. These components are placed in an autoclave and heated under pressure from outside the bagging film 23 while the air in the sealed inside is discharged by an exhaust pump (not shown in the figures). For example, they are kept at 120° C. for 3 hours under a pressure of 3 atmospheres.

The pressurizing and heating conditions are set appropriately depending on the resin used for the prepregs. Finally, these are cooled to room temperature and then taken out of the autoclave, and then the bagging film 23 and the mandrel 21 are removed to complete the pipe structure.

By such a process, a resin component of the prepreg laminate 22 once melts, so that the prepreg laminate 22 and the intermediate parts 4 are integrated into an FRP pipe. Due to the heating under pressure in the autoclave, the end portions of the moisture-proof foils 11 and 12 are tightly sandwiched between the pipe and the intermediate part. Furthermore, due the heating under pressure in the autoclave, the pipe structure contains no moisture immediately after its completion.

Thus, the pipe structure made by such a process contains no moisture. Further, because the outer and inner circumferential surfaces of the FRP pipe are covered with the moisture-proof foils, and the end portions of the moisture-proof foils are tightly sandwiched between the pipe and the intermediate parts, the moisture-proof foils do not detach from the pipe even after cooling. Therefore, it is possible to reliably prevent the FRP pipe from absorbing moisture. This resultantly prevents the shrinkage due to moisture exhaustion in outer space, thereby giving a high dimensional stability to the pipe structure and the truss structure. In addition, the metal intermediate parts and the metal joints neither absorb moisture nor exhaust moisture.

Figure 8:
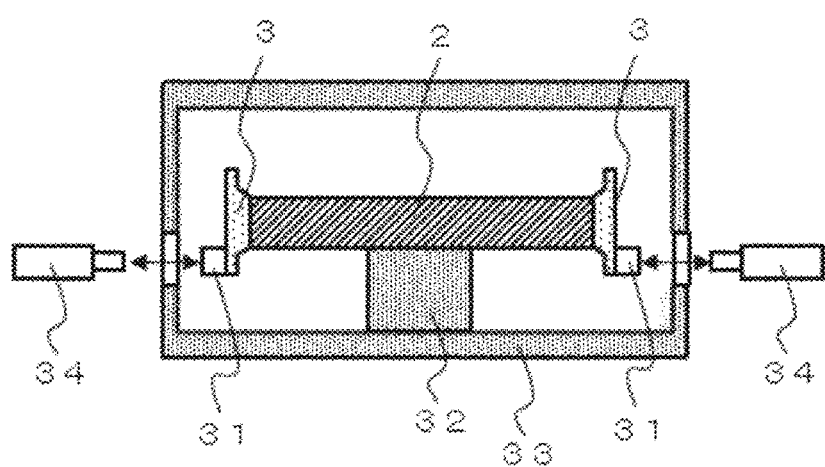
FIG. 8 is a cross-sectional view of a measurement system for the pipe structure of Embodiment 1 of the present disclosure.

Measurement examples on dimensional stability of the pipe structure obtained by the present embodiment will be described. FIG. 8 is a cross-sectional view showing the configuration of a measurement system for measuring the coefficient of thermal expansion in the longitudinal (axial) direction of the pipe structure of the present embodiment. In FIG. 8, the joints 3 are connected to both ends of the pipe structure 2 in the manner shown in FIGS. 3 and 4.

As shown in FIG. 8, laser reflectors 31 are each adhered and fixed to the outer face of each of the joints 3 connected to both ends of the pipe structure 2. This pipe structure 2 is placed on a sample support base 32, and they are put in a thermo-hygrostat 33. Laser displacement gauges 34 are each disposed opposite to the corresponding laser reflector 31. Through a window of the thermo-hygrostat 33, each laser displacement gauge emits a laser beam to the corresponding laser reflector 31 and receives the reflected beam to measure a deformation amount of the pipe structure 2. The temperature and humidity in the thermo-hygrostat 33 were controlled to measure changes in the deformation amount of the pipe structure 2 with the passage of time.

The FRP pipe of the pipe structure 2 used for the measurement has an inner diameter of 50 mm, an outer diameter of 55 mm, and a length of 300 mm. Two kinds of prepregs were used as the material of the FRP pipe. One was a prepreg of K13C (made by Mitsubishi Chemical Corporation) impregnated with cyanate resin, and the other was a prepreg of T800S (made by Toray Industries, Inc.) impregnated with cyanate resin.

The thermal expansion coefficient in the longitudinal (axial) direction of the FRP pipe was designed to be within±0.1 ppm/K by adjusting the ratio of the numbers of these two types of prepregs to be stacked and by adjusting their respective fiber orientation angles. Aluminum foil was used as the moisture-proof foils. Super invar was used for the material for the joints 3 and the intermediate parts.

The inside environment of the thermo-hygrostat 33 was kept at a temperature of 25±2° C. and a humidity of 50±10% RH. The pipe structure 2 was put therein for 300 hours, and then the deformation amount of the pipe structure 2 in the longitudinal direction was measured. As a result, it was found that the pipe structure expands by 0.5 µm in the longitudinal direction. For comparison, a pipe structure without moisture-proof foils was made and the amount of deformation was measured under the same conditions. As a result, it was found that this pipe structure expands by 5 µm in the longitudinal direction. If the pipe structure expands by 0.5 µm on the ground, the maximum shrinkage due to moisture exhaustion in outer space is expected to be 0.5 µm.

On the other hand, in a temperature variation range (±10K) which the support structure of the large mirror of the optical observation satellite experiences, the pipe structure thermally deforms about±0.3 µm. Therefore, the maximum shrinkage value of 0.5 µm due to moisture exhaustion is substantially the same as the thermal deformation. Thus, this shrinkage value is within the acceptable range for the support structure of the large mirror of the optical observation satellite.

On the other hand, the pipe structure without the moisture-proof foils expands by 5 µm on the ground. Accordingly, the shrinkage of the pipe structure without the moisture-proof foils will be 5 µm at its maximum in outer space. This deformation is larger than the thermal deformation, which causes problems on the dimensional stability.

In the present embodiment, the outer and inner circumferential surfaces of the FRP pipe are covered with moisture-proof foils, and the end portions of the moisture-proof foils are tightly sandwiched between the pipe and the intermediate parts. Therefore, it is possible to reliably prevent the FRP pipe from absorbing moisture. As a result, the shrinkage due to moisture exhaustion in outer space is prevented, and thus it is possible to obtain the pipe structure and the truss structure with a high dimensional stability.

In the present embodiment, at each end of the pipe, the pipe has a protrusion so as to project toward the intermediate part, and the intermediate part has a recessed portion at a position to be fitted with the protrusion of the pipe. However, the convex and recessed portions may not be provided. If the end portions of the moisture-proof foils covering the outer and inner circumferential surfaces of the pipe are tightly sandwiched between the pipe and the intermediate parts, it is possible to prevent the FRP pipe from absorbing moisture.

In the present embodiment, an aluminum foil is used as the moisture-proof foil, but a material other than the aluminum foil may be used if it does not allow moisture to permeate. For example, a nickel foil, a titanium foil, a copper foil, and a brass foil (a copper-zinc alloy foil) may be used as the moisture-proof foil. If the moisture-proof foil is required to have an electrical insulation strength, these metal foils may be laminated with, for example, polyester resin or the like, to be used as moisture-proof foils.

In the present embodiment, a cylindrical pipe structure has been described; but a structure with a polygonal cross-section may be used, if the structure has a tubular shape.

Also, in the present embodiment, the joint 3 and the intermediate part 4 are fastened together with a bolt and a nut using the penetration hole 6 formed in the joint 3 and the penetration hole 7 formed in the intermediate part 4 at a position corresponding to that the penetration hole 6. However, these components may be fastened and fixed using other methods. For example, the methods include mechanical fastening such as rivet joining and screw joining, and metallurgical joining such as melt bonding and crimp connecting.

In this embodiment, it is described that the prepregs are composed of carbon fibers. However, fibers other than carbon fibers, such as glass fibers or ceramic fibers, may also be used for the prepregs.

Embodiment 2

The pipe structure of Embodiment 1 has one protrusion at each end of the pipe; in Embodiment 2, a pipe structure provided with two or more protrusions will be described.

FIG. 9 are illustrative views showing a manufacturing process of a pipe structure 2 in the present embodiment. FIG. 9(e) is a schematic view of the pipe structure 2 when a laminating process is completed. As shown in this figure, a plurality of split intermediate parts 4a to 4d is prepared as the intermediate part 4. Each of the split intermediate parts 4a to 4d has a recessed portion corresponding to each of the protrusions of the pipe. The pipe is formed of a prepreg laminate 22 that is made by layering a plurality of prepregs 22a.

Figure 9A:
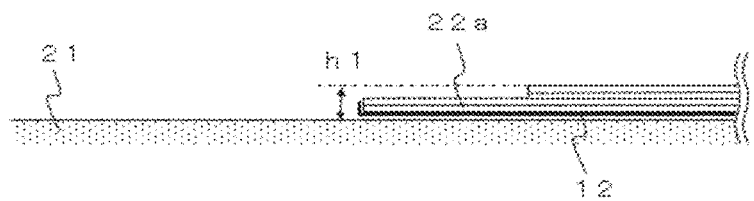
FIGS. 9A and 9E are illustrative views of a manufacturing process of a pipe structure of Embodiment 2 of the present disclosure.

First, as shown in FIG. 9(a), a moisture-proof foil 12 being the foil of the inner circumferential side is placed on the mandrel 21; and then, a plurality of prepregs 22a is stacked on top of it. At this moment, the lengths of the prepregs 22a in the axial direction are accordingly set so as to correspond to the protrusions of the pipe.

In the example of FIG. 9(a), two prepregs 22a to be formed as a protrusion are made long in the axial-direction, and the next two prepregs 22a stacked on them are made shorter than that.

In this case, the thickness h1 of the stacked prepregs is made almost equal to the thickness of the split intermediate part 4a. An end portion of the moisture-proof foil 12 is bent along the end of the prepreg 22a.

Figure 9B:
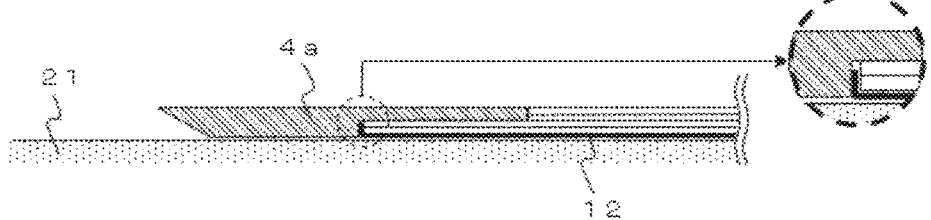

Next, as shown in FIG. 9(b), the split intermediate part 4a is placed. At this moment, as shown in an enlarged view on the right side of FIG. 9(b), the end portion of the moisture-proof foil 12 is tightly sandwiched between the prepreg laminate and the split intermediate part 4a.

Figure 9C:
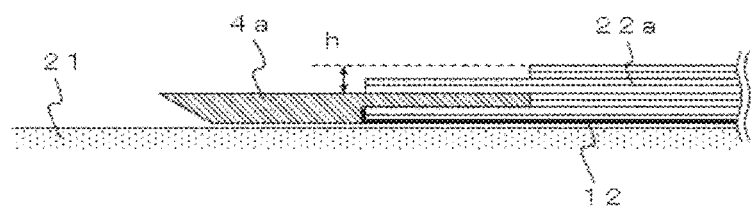

Next, as shown in FIG. 9(c), a plurality of prepregs 22a is stacked on the split intermediate part 4a and the prepregs already stacked. At this moment, the lengths of the prepregs 22a in the axial direction are accordingly set so as to correspond to the protrusions of the pipe. Also at this time, the thickness h2 of the stacked prepregs is made almost equal to the thickness of the split intermediate part 4b.

Figure 9D:
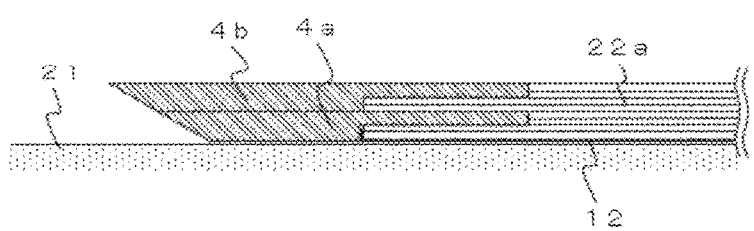

Next, as shown in FIG. 9(d), the split intermediate part 4b is placed. Thereafter, the work of stacking the prepregs 22a and the work of stacking the split intermediate part are repeated.

Figure 9E:
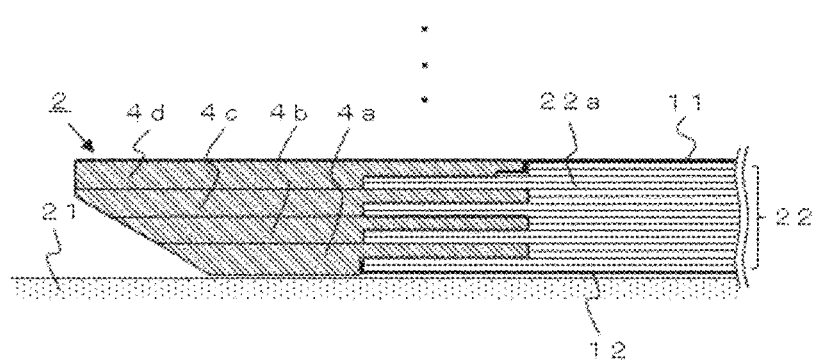

Next, as shown in FIG. 9(e), after placing the topmost prepreg 22a, the moisture-proof foil 11 being the foil of the outer circumferential side is placed, and the end portion of the moisture-proof foil 11 is bent along the end of the prepreg 22a. The split intermediate part 4d is placed on the top of the foil, to thereby complete the laminating process of the pipe structure 2.

Finally, the pipe structure 2 for which the laminating process has been done is pressurized and heated using the autoclave described in Embodiment 1, whereby the pipe structure 2 is completed.

In a pipe structure made by such a process, it is similar to Embodiment 1 in that the outer and inner circumferential surfaces of the FRP pipe are covered with moisture-proof foils, and the end portions of the moisture-proof foils are tightly sandwiched between the pipe and the intermediate parts. Therefore, it is possible to reliably prevent the FRP pipe from absorbing moisture.

Moreover, the pipe has the plurality of protrusions formed in the radial direction thereof. This makes the pipe be further tightly jointed with the intermediate parts, thus improving the strength of the pipe structure.

Embodiment 3

In the pipe structures described in Embodiment 1 and Embodiment 2, it is important that the end portions of the moisture-proof foils are tightly sandwiched between the pipe and the intermediate parts. In Embodiment 3, another configuration will be described in which the end portions of the moisture-proof foils are tightly sandwiched between the pipe and the intermediate parts.

Figure 10:
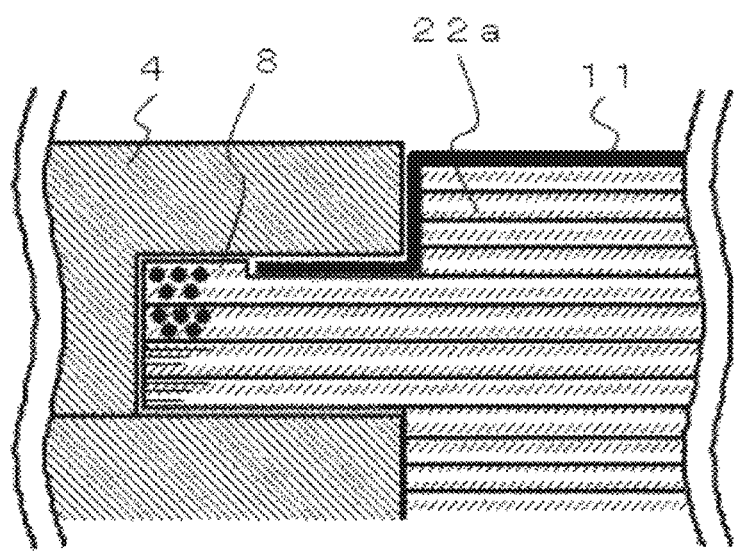
FIG. 10 is a cross-sectional schematic view of a part of a pipe structure of Embodiment 3 of the present disclosure.

FIG. 10 is a cross-sectional schematic view of a part of a pipe structure 2 of the present embodiment. The pipe structure of the present embodiment is a pipe structure which includes the plurality of protrusions described in Embodiment 2, and FIG. 10 shows the protrusion located at the radially outermost circumference. As shown in FIG. 10, the protrusion 8 located at the outermost circumference of the pipe 5 of the present embodiment is composed of four layered prepregs 22a.

Among the four layered prepregs 22a, the two radially inner prepregs 22a are set so as to have their carbon fiber orientations parallel to the axial direction of the pipe structure. Among the four layered prepregs 22a of the protrusion 8 located at the outermost circumference of the pipe 5, the two radially outer prepregs 22a are set so as to have their carbon fiber orientations orthogonal to the axial direction of the pipe structure.

In general, the thermal expansion coefficient of a prepreg is anisotropic with respect to the orientation of the carbon fibers. More specifically, the coefficient of thermal expansion in a direction parallel to the orientation of the carbon fibers is smaller than that in a direction orthogonal to the orientation of the carbon fibers. Therefore, the protrusion 8 located at the outermost circumference of the pipe of the present embodiment is sectioned into two regions with respect to the radial direction of the pipe; the radially outer region has a thermal expansion coefficient, in the axial direction, larger than the radially inner region.

Similarly, the protrusion 8 located at the innermost circumference of the pipe 5 is composed of four layered prepregs 22a, which is not shown in the figure though; the two radially inner prepregs 22a are set to have their carbon fiber orientations orthogonal to the axial direction, and the two radially outer prepregs 22a are set to have their carbon fiber orientations parallel to the axial direction.

In a case where the pipe structure described in Embodiment 2 is to be produced using the pipe made according to the above, when the pipe structure is completed using the autoclave, the protrusion located at the outermost circumference is warped radially outward in the cooling process.

This is because the axial thermal expansion coefficient of the radially outer region is larger than that of the radially inner region, so that the radially outer region shrinks more during the cooling process. Therefore, the moisture-proof foil 11 is pushed radially outward and closely attached to the intermediate part 4. At the same time, the protrusion located at the innermost circumference is warped radially inward. Therefore, the moisture-proof foil 12 is pushed radially inward and closely attached to the intermediate part 4.

When the pipe structure of the present embodiment is completed by using the autoclave, the moisture-proof foils 11 and 12 are pushed, in the cooling process, toward the intermediate part 4 to be closely attached thereto. As a result, the end portions of the moisture-proof foils are tightly sandwiched between the pipe and the intermediate parts, so that the moisture absorption can be prevented more reliably.

In the pipe structure according to the present embodiment in which a plurality of protrusions is provided, both of the outermost circumferential protrusion and the innermost circumferential protrusion each have two regions whose thermal expansion coefficients are different. However, only one of the two protrusions may have such two regions.

In the present embodiment, protrusions are each sectioned into two regions, and the carbon fiber orientations in the respective regions are set to be orthogonal to each other. However, the orientations are not necessarily to be orthogonal. It is only necessary that there exists a thermal expansion coefficient difference enough to produce, during the cooling process, an action for pushing the moisture-proof foil in a direction to attach it to the intermediate part. Therefore, it is sufficient that the carbon fiber orientations of the respective regions intersect with each other.

Embodiment 4

Figure 11:
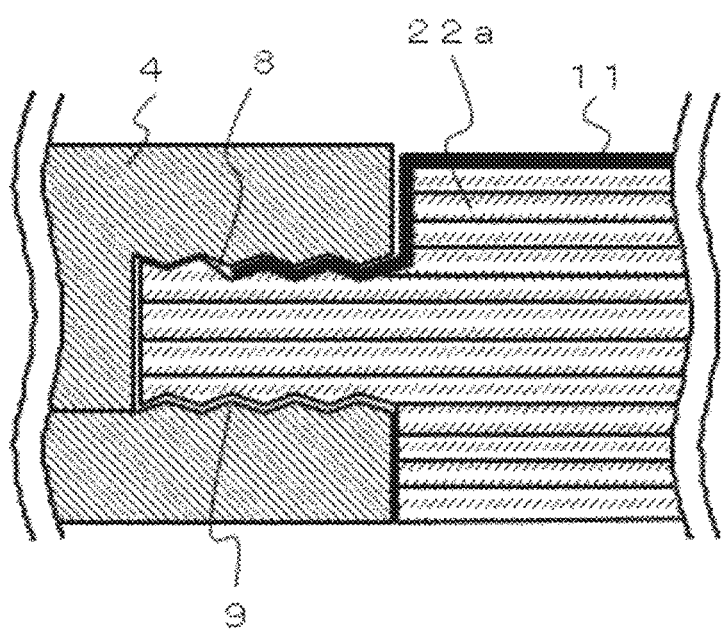
FIG. 11 is a cross-sectional schematic view of a part of a pipe structure of Embodiment 4 of the present disclosure.

FIG. 11 is a cross-sectional schematic view of a part of a pipe structure 2 of the present embodiment. The pipe structure of the present embodiment is a pipe structure provided with the plurality of protrusions described in embodiment 2. FIG. 11 shows a protrusion located at the radially outermost circumference. As shown in FIG. 11, in the pipe structure of the present embodiment, a recessed portion of the intermediate part 4 that corresponds to a protrusion 8 located at the radially outermost circumference of the pipe 5 has a rough outer circumference surface and a rough inner circumference surface.

When the pipe structure of the present embodiment is heated under pressure using an autoclave, the rough surfaces of the intermediate part 4 bite into the prepregs 22a. As a result, the end portion of the moisture-proof foil is tightly sandwiched between the pipe and the intermediate part, thereby further reliably preventing moisture absorption.

In the present embodiment, the pipe structure provided with a plurality of protrusions has been described, but this technique can also be applied to a pipe structure with a single protrusion.

DESCRIPTION OF THE SYMBOLS

1: truss structure,
2: pipe structure,
3: joint,
4: intermediate part,
5: pipe,
6, 7: penetration hole,
8: protrusion,
9: recessed portion,
10: artificial satellite,
11, 12: moisture-proof foil,
21: mandrel,
22: prepreg laminate,
22a: prepreg,
23: bagging film,
24: sealing material,
31: laser reflector,
32: sample support base,
33: thermo-hygrostat,
34: laser displacement gauge,
35: reflector

The invention claimed is:
1. A pipe structure comprising:
a pipe including rigid fiber-reinforced plastic;
moisture-proof foils which individually cover an outer circumferential surface of the pipe and an inner circumferential surface thereof; and
an intermediate part including metal and fitted to an end of the pipe,
wherein end portions of the moisture-proof foils are sandwiched between the pipe and the intermediate part.
2. The pipe structure according to claim 1, wherein the pipe includes at least one protrusion projecting in an axial direction at the end thereof.
3. The pipe structure according to claim 2, wherein the at least one protrusion comprises a plurality of protrusions arranged in a radial direction.
4. The pipe structure according to claim 3, wherein a protrusion located at a radially outermost circumference among the plurality of protrusions is sectioned into two regions arranged in the radial direction of the pipe, and a radially outer region of the two regions has a larger coefficient of thermal expansion in the axial direction than a radially inner region.
5. The pipe structure according to claim 3, wherein a protrusion located at a radially innermost circumference among the plurality of protrusions is sectioned into two regions arranged in the radial direction of the pipe, and a radially inner region of the two regions has a larger coefficient of thermal expansion in the axial direction than a radially outer region.
6. The pipe structure according to claim 4, wherein a fiber orientation direction of the fiber-reinforced plastic of the radially inner region differs from that of the fiber-reinforced plastic of the radially outer region.
7. The pipe structure according to claim 5, wherein a fiber orientation direction of the fiber-reinforced plastic of the radially inner region differs from that of the fiber-reinforced plastic of the radially outer region.
8. The pipe structure according to claim 6, wherein the fiber orientation direction of the fiber-reinforced plastic of the radially inner region is orthogonal to the fiber orientation direction of the fiber-reinforced plastic of the radially outer region.
9. The pipe structure according to claim 7, wherein the fiber orientation direction of the fiber-reinforced plastic of the radially inner region is orthogonal to the fiber orientation direction of the fiber-reinforced plastic of the radially outer region.
10. The pipe structure according to claim 1, wherein a surface of the intermediate part which faces the pipe through the moisture-proof foils is rough.
11. A truss structure comprising:
a plurality of pipe structures according to claim 1, and
a plurality of metal joints jointed to the intermediate parts of the plurality of pipe structures.
12. An artificial satellite, comprising:
at least one pipe structure which includes:
a pipe including fiber-reinforced plastic;
moisture-proof foils which individually cover an outer circumferential surface of the pipe and an inner circumferential surface thereof; and
an intermediate part including metal and fitted to an end of the pipe,
wherein end portions of the moisture-proof foils are sandwiched between the pipe and the intermediate part.
13. The artificial satellite according to claim 12,
wherein the at least one pipe structure comprises a plurality of pipe structure,
wherein the artificial satellite further comprises
a plurality of metal joints which is jointed to the intermediate parts of the plurality of pipe structures,
and wherein a truss structure is formed with the plurality of pipe structure and the plurality of metal joints.

14. An artificial satellite comprising at least one pipe structure according to claim 1.

* * * * *